(12) United States Patent
Tonegawa

(10) Patent No.: US 8,139,242 B2
(45) Date of Patent: Mar. 20, 2012

(54) IMAGE PROCESSING APPARATUS AND METHOD

(75) Inventor: Nobuyuki Tonegawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1135 days.

(21) Appl. No.: 10/758,198

(22) Filed: Jan. 16, 2004

(65) Prior Publication Data

US 2004/0150855 A1 Aug. 5, 2004

(30) Foreign Application Priority Data

Jan. 22, 2003 (JP) ................................. 2003-013734

(51) Int. Cl.
*G06F 3/12* (2006.01)
*G06K 15/00* (2006.01)
(52) U.S. Cl. ..................... 358/1.15; 358/1.1; 358/1.18
(58) Field of Classification Search .................. None
See application file for complete search history.

(56) References Cited

U.S. PATENT DOCUMENTS

| 5,227,893 A * | 7/1993 | Ett .................................. 358/400 |
| 6,751,352 B1 * | 6/2004 | Baharav et al. ................. 382/183 |
| 7,158,250 B2 * | 1/2007 | Nagashima .................. 358/1.15 |
| 2002/0030836 A1 * | 3/2002 | Motoyama .................... 358/1.9 |
| 2002/0122202 A1 * | 9/2002 | Nagashima .................. 358/1.15 |

FOREIGN PATENT DOCUMENTS

| JP | 7-21344 | 1/1995 |
| JP | 8-263622 | 10/1996 |
| JP | 9-251524 | 9/1997 |
| JP | 2000-101671 | 4/2000 |

OTHER PUBLICATIONS

Japanese Official Communication dated Jun. 9, 2008, Regarding Application No. 2003-013734.

* cited by examiner

*Primary Examiner* — Twyler Haskins
*Assistant Examiner* — Marcus T Riley
(74) *Attorney, Agent, or Firm* — Fitzpatrick, Cella, Harper & Scinto

(57) ABSTRACT

The present invention is related to an image processing apparatus and method for efficiently managing a document. First data created by predetermined application software and second data converted into image data of a predetermined format (ex. PDF format) based on the first data are received. The first and second data are registered in a database in correspondence with a specific index. Then, either the first data or the second data is selected based on an output method designation and received information representing the index, and the selected data in accordance with the output method is output.

10 Claims, 18 Drawing Sheets

FIG. 8

THE SLEREXE COMPANY LIMITED
SAPORS LANE . BOOLE . DORSET . BH 25 8 ER
TELEPHONE BOOLE (945 13) S1617 . TELEX 123456

Our Ref. 350/PJC/EAC                  18th January, 1972.

Dr . P. N. Cundall,
Mining Surveys Ltd.,
Holroyd Road,
Reading,
Berks.

Dear Pete,

Permit me to introduce you to the facility of facsimile transmission.

In facsimile a photocell is caused to perform a raster scan over the subject copy. The variations of print density on the document cause the photocell to generate an analogous electrical video signal. This signal is used to modulate a carrier, which is transmitted to a remote destination over a radio or cable communications link.

At the remote terminal, demodulation reconstructs the video signal, which is used to modulate the density of print produced by a printing device. This device is scanning in a raster scan synchronized with that at the transmitting terminal. As a result, a facsimile copy of the subject document is produced.

Probably you have uses for this facility in your organisation.

Yours sincerely,

*Phil.*

P. J. CROSS
                                     Group Leader - Facsimile Research

F I G. 14
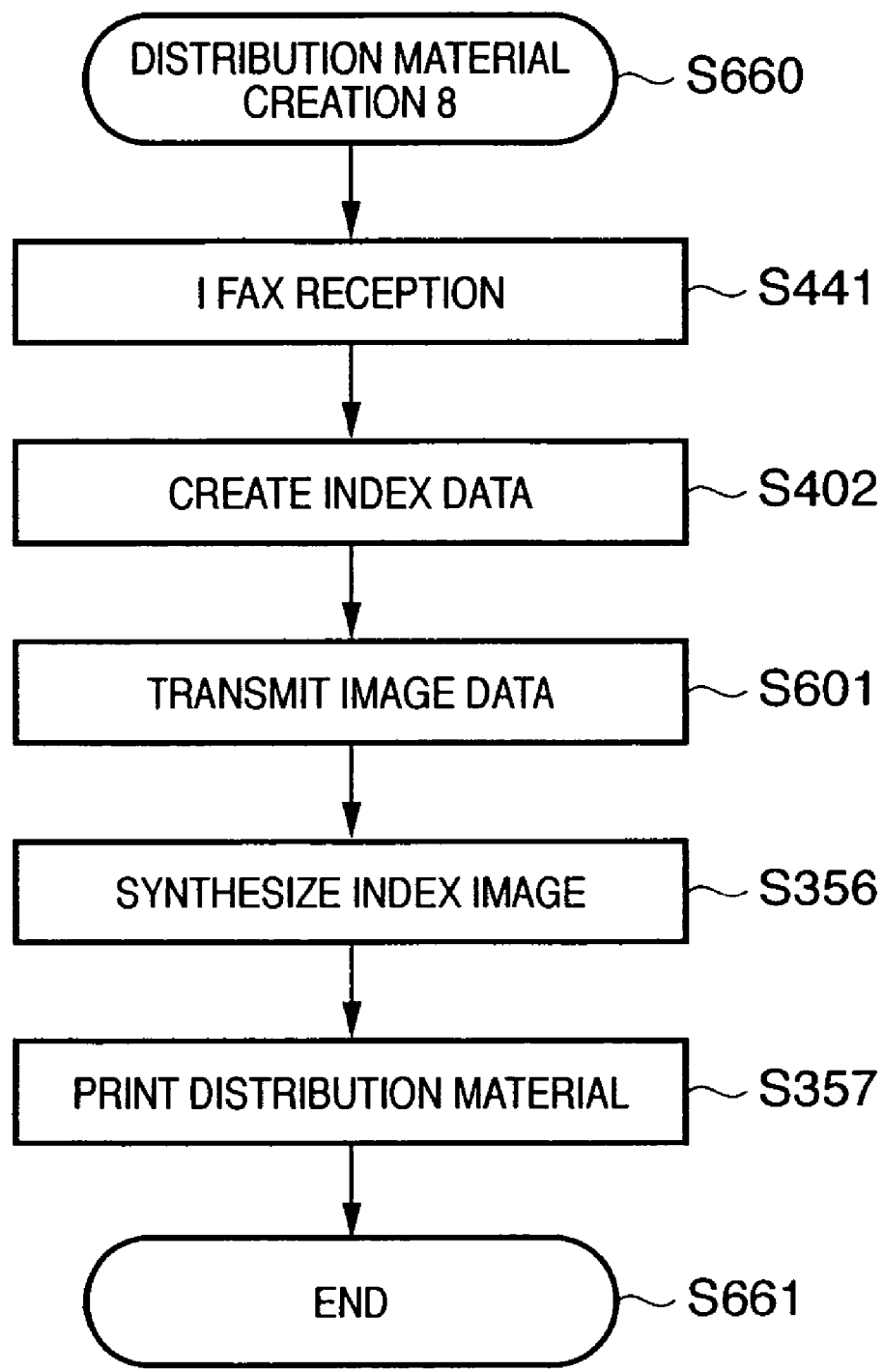

THE SLEREXE COMPANY LIMITED
SAPORS LANE . BOOLE . DORSET . BH 25 8 ER
TELEPHONE BOOLE (945 13) S1617 . TELEX 123456

Our Ref. 350/PJC/EAC　　　　　　　　　　18th January, 1972.

Dr . P. N. Cundall,
Mining Surveys Ltd.,
Holroyd Road,
Reading,
Berks.

Dear Pete,

Permit me to introduce you to the facility of facsimile transmission.

In facsimile a photocell is caused to perform a raster scan over the subject copy. The variations of print density on the document cause the photocell to generate an analogous electrical video signal. This signal is used to modulate a carrier, which is transmitted to a remote destination over a radio or cable communications link.

At the remote terminal, demodulation reconstructs the video signal, which is used to modulate the density of print produced by a printing device. This device is scanning in a raster scan synchronized with that at the transmitting terminal. As a result, a facsimile copy of the subject document is produced.

Probably you have uses for this facility in your organisation.

Yours sincerely,

*Phil.*

P. J. CROSS
Group Leader - Facsimile Research

700

PC_COPY. abc. co. jp/DB/001

FIG. 18

| | INDEX | CHARACTER STRING |
|---|---|---|
| 800 | 000 | Dear |
| 801 | 001 | Dea r |
| 802 | 010 | De ar |
| 803 | 011 | De a r |
| 804 | 100 | D ear |
| 805 | 101 | D ea r |
| 806 | 110 | D e ar |
| 807 | 111 | D e a r |

IMAGE PROCESSING APPARATUS AND METHOD

FIELD OF THE INVENTION

The present invention relates to an image processing apparatus and method for efficiently managing a document.

BACKGROUND OF THE INVENTION

Recently, along with the spread of computers, materials for use at an office are often created by an application program such as wordprocessor software or spreadsheet software installed in a computer. It also becomes popular to print, by a printer, application data created by an application program, copy the printed material by a necessary number of copies, and distribute them at a meeting or the like.

The distributed material is bounded by a binder or the like and saved, or managed by an electronic filing device.

In some cases, application data is managed by a common file server or database software so as to share information.

A distributed printed material is often prepared by copying an originally printed material. The distributed material is further copied and redistributed.

Repetitive copying degrades the image quality accordingly, resulting in a poor image. When a color original is distributed, it is often copied in monochrome because a color copying apparatus is expensive and does not so prevail, greatly degrading the image.

To quote part of an original distributed by paper and newly reuse it as computer data, the original image is read by a scanner and processed as an image. The read image undergoes OCR to extract character data.

Processing of data as an image greatly increases the data amount, and makes it difficult to correct part of the data.

Extraction of character data by OCR also suffers problems such that an error occurs and character data cannot be correctly recognized, even if character data is correctly recognized, the font style and size cannot be reproduced, or the layout is lost.

Data can be easily reused if application data managed by a file server or database is acquired. If, however, data is not stored in the file server or database by the user himself, the location and name of the data and its search parameter cannot be obtained, and the data is hardly acquired.

SUMMARY OF THE INVENTION

It is an object of the present invention to provide an image processing apparatus and method capable of selectively outputting image data or its original data in accordance with the output purpose of a document.

According to one aspect of the present invention, preferably, an image processing apparatus comprises:

first input means for inputting first data created by predetermined application software;

second input means for inputting second data converted into image data of a predetermined format on the basis of the first data;

registration-means for registering the first and second data in a database in correspondence with a specific index;

output means for outputting either of the first and second data which are registered in the database;

designation means for designating an output method by the output means;

index input means for inputting information representing the index; and control means for so controlling as to select either of the first and second data on the basis of the output method designated by the designation means and the information which is input by the index input means and represents the index, and cause the output means to output the selected data in accordance with the output method.

According to another aspect of the present invention, preferably, an image processing method comprises:

a first input step of inputting first data created by predetermined application software;

a second input step of inputting second data converted into image data of a predetermined format on the basis of the first data;

a registration step of registering the first and second data in a database in correspondence with a specific index;

a designation step of designating an output method of the data registered in the database;

an index input step of inputting information representing the index; and an output step of selecting either of the first and second data on the basis of the output method designated in the designation step and the information which is input in the index input step and represents the index, and outputting the selected data in accordance with the output method.

Other features and advantages of the present invention will be apparent from the following descriptions taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the descriptions, serve to explain the principle of the invention.

FIG. 8 is a view showing an example of a created distribution material;

FIG. 14 is a flow chart showing the processing sequence of distribution material creation 8 according to the second embodiment;

FIG. 17 is a view showing an example of index information recorded in a distribution material according to the third embodiment; and FIG. 18 is a table showing an example of index information recorded in a distribution material according to the fourth embodiment.

DETAILED DESCRIPTION OF THE PREFERRED EMBODIMENTS

Preferred embodiments of the present invention will now be described in detail in accordance with the accompanying drawings.

First Embodiment

Figure 1:
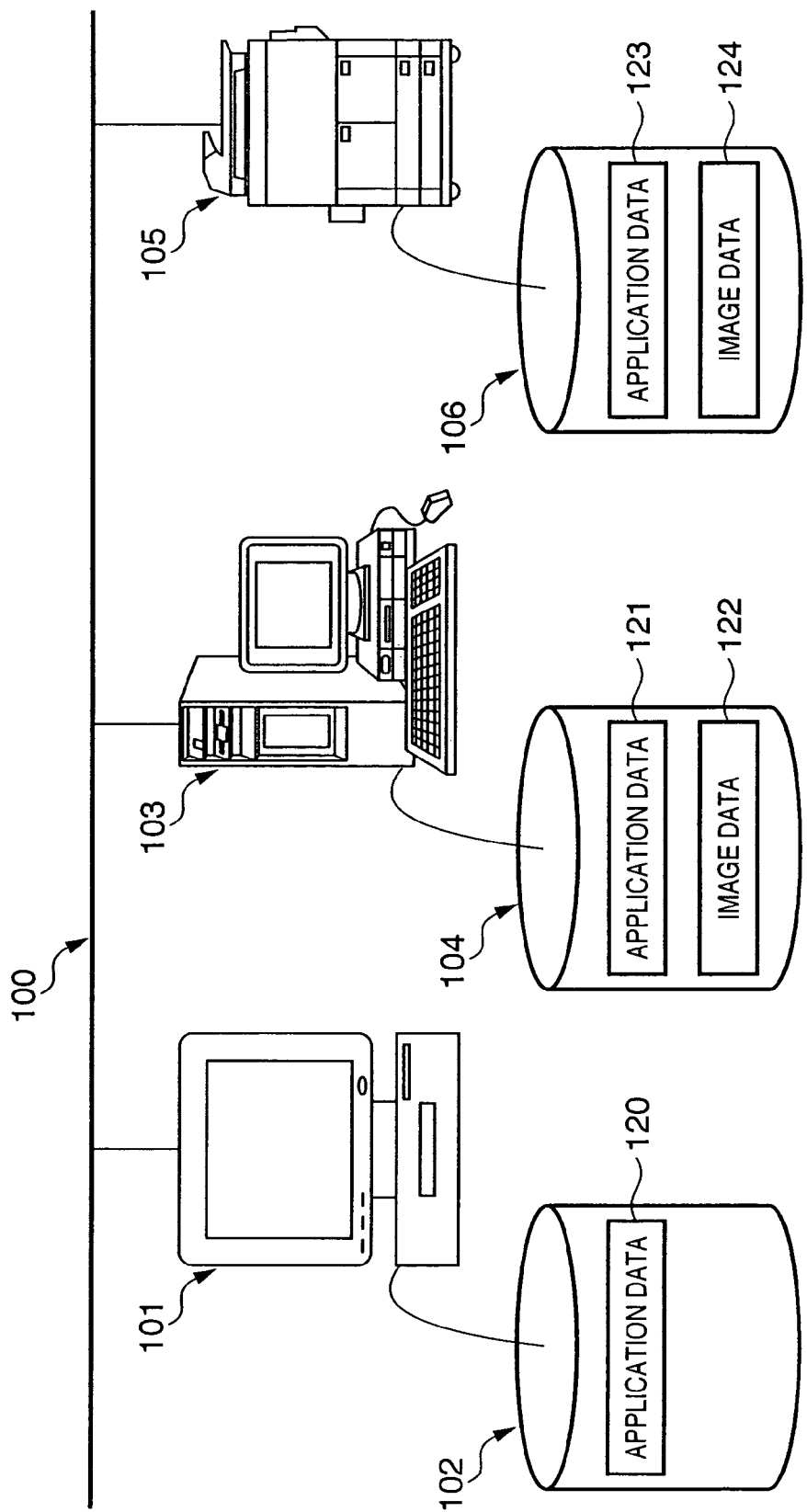
FIG. 1 is a view showing the configuration of a network system according to an embodiment of the present invention.

FIG. 1 is a view showing the configuration of a network system according to the first embodiment of the present invention.

Reference numeral 101 denotes a personal computer (PC) in which application software (to be also simply referred to as an "application" hereinafter) such as wordprocessor software, spreadsheet software, or electronic mail software runs. The PC 101 is connected to a large-capacity disk 102, and the large-capacity disk 102 stores application data 120 created by an operating system, printer driver, application program, and application. The large-capacity disk 102 also stores a distribution material creation program for causing a multifunction copying apparatus 105 (to be described later) to print a distribution material.

The PC 101 is connected to a LAN 100, and can print data created by an operating system, application, and printer driver by a network printer.

The multifunction copying apparatus 105 has a copying function, facsimile (FAX) function, and network printing function. The multifunction copying apparatus 105 is connected to the LAN 100. In addition to the copying function, facsimile function, and network printing function, the multifunction copying apparatus 105 has a transmission function of transmitting image data read by a scanner to a network PC, and an Internet FAX (to be referred to as "IFAX" hereinafter) function of exchanging image data via a network.

When the application data 120 of the PC 101 is to be printed by using the network printing function of the multifunction copying apparatus 105, a corresponding application is activated in the PC 101. The application calls a printer driver which is installed in the PC 101 and corresponds to the multifunction copying apparatus 105. The application creates PDL (Page Description Language) data, and transmits the PDL data to the multifunction copying apparatus 105. The multifunction copying apparatus 105 which has received the PDL data rasterizes an image from the PDL data, and prints the created image by the printer.

The LAN 100 is also connected to a document management server 103. The document management server 103 associates and manages application data 121 stored in a large-capacity disk 104 and image data 122 created from the application data 121. The image data 122 is data of each page in a predetermined image format on the basis of the application data. The image data 122 may be PDL (Page Description Language) data such as TIFF (Tag Image File Format) data, PDF (Portable Document Format), or PostScript® data.

The multifunction copying apparatus 105 also comprises a document management server function, and a large-capacity disk 106 stores application data 123 and image data 124. Detailed operation of the document management server function will be described later.

Figure 2:
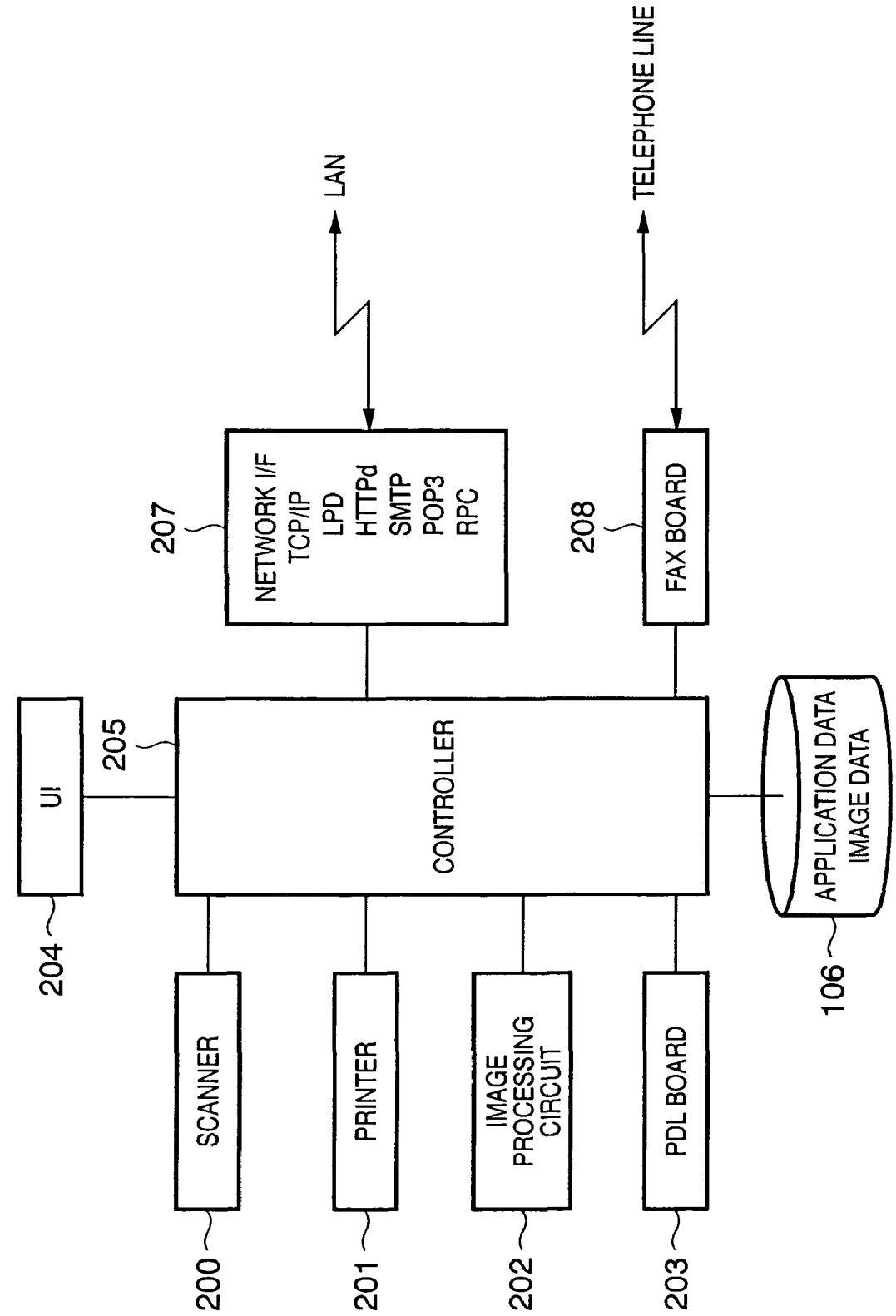
FIG. 2 is a block diagram showing the configuration of a multifunction copying apparatus according to the embodiment of the present invention.

FIG. 2 is a block diagram showing the configuration of the multifunction copying apparatus 105.

An original feeder is mounted on a scanner 200. The original feeder feeds original sheets one by one from the first page onto a platen glass, and after the end of original read operation, discharges the original sheet from the platen glass. When an original sheet is fed onto the platen glass, the lamp is turned on and the scanner unit starts moving. As the scanner unit moves, the original sheet is exposed and scanned, and light reflected by it in exposure/scanning is guided to a CCD image sensor via a mirror and lens. The scanned original image is read by the CCD image sensor. The CCD image sensor photoelectrically converts the optically read image into image data, and outputs the image data.

A printer 201 inputs the image data output from the scanner 200 to a laser driver. The laser driver drives a laser-emitting portion on the basis of the input image data. The laser-emitting portion emits a laser beam corresponding to the input image data. The laser beam scans and irradiates a photosensitive drum, and an electrostatic latent image corresponding to the laser beam is formed on the photosensitive drum.

The electrostatic latent image on the photosensitive drum is visualized as a developer mix image by a developer mix supplied from a developing unit. At a timing synchronized with the start of laser beam irradiation, a recording sheet is fed from a recording sheet cassette, and conveyed between the photosensitive drum and a transfer portion. The developer mix image formed on the photosensitive drum is transferred onto the fed recording sheet by the transfer portion.

The recording sheet bearing the developer mix image is conveyed to a fixing portion. The fixing portion fixes the developer mix image onto the recording sheet by thermally pressing the recording sheet. The recording sheet having passed through the fixing portion is discharged by a discharge roller. When a sorter is mounted, it stores the discharged recording sheet to a corresponding bin, thus sorting the recording sheet.

An image processing circuit 202 performs various image processes such as trimming processing, and image scaling such as image enlargement/reduction. Also, the image processing circuit 202 compresses image data into code data such as MH, MR, MMR, JBIG, or JPEG data, or decompresses code data into image data.

A PDL board 203 is a circuit which maps PDL data received by a network interface (I/F) 207 into image data printable by the printer 201.

A user interface (UI) 204 is an operation panel comprised of, e.g., a liquid crystal display and touch screen. The UI 204 also comprises hard keys such as a start key, stop key, and ten-key pad.

The network I/F 207 is a circuit for connecting the LAN 100. The program structure includes application programs such as a network layer TCP/IP formed by a network layer IP (Internet Protocol), TCP (Transmission Control Protocol), and UDP (User Datagram Protocol), a file transfer service FTP (File Transfer Protocol), a printer printing server protocol LPD (Line Printer Daemon), a WWW (World Wide Web) server protocol HTTPd (HyperText Transfer Protocol daemon), an electronic mail exchange protocol SMTP (Simple Mail Transfer Protocol), a mail download protocol POP3 (Post Office Protocol-version 3), and RPC (Remote Procedure Call) serving as function of calling a subroutine present in a remote system via a network.

A FAX board 208 is a facsimile communication board comprised of an NCU (Network Control Unit) serving as a circuit which switches between the telephone and the FAX, detects a call signal in reception, and holds a DC loop signal from a telephone exchange during communication, a MODEM (MOdulator/DEModulator) serving as a modulation/demodulation circuit which converts an analog signal into a digital signal and a digital signal into an analog signal, an image processing circuit, and the like.

Reference numeral 205 denotes a controller which comprehensively controls the above units.

When the multifunction copying apparatus 105 having this configuration executes copying operation, the user sets the number of copies and an image processing method such as trimming designation via the UI 204, and presses the start key. The controller 205 then receives a copy start instruction and drives the scanner 200. The controller 205 controls the image processing circuit 202 and printer 201 such that the image processing circuit 202 performs predetermined image processing for image data from the scanner 200 and the printer 201 executes print operation on the basis of a signal having undergone image processing.

In FAX transmission, image data-read by the scanner 200 is input to the FAX board 208 via the image processing circuit 202. The FAX board 208 operates circuits such as the MODEM and NCU, communicates with the transmission destination, scales and encodes an image in accordance with the receiver performance, and transmits the image data. In FAX reception, data is received by the NCU, and converted into a digital signal by the MODEM. The controller 205 operates such that the data is encoded again by the image processing circuit 202 and printed by the printer 201.

When the application data 120 from the PC 101 is to be printed, the printer driver installed in the PC 101 creates PDL data and transmits it to the multifunction copying apparatus 105 by an LPR (Line Printer Request). The multifunction copying apparatus 105 receives the PDL data in response to the LPD via the network I/F 207, and creates rasterized image data in the PDL board 203. The controller 205 controls the printer 201 so as to print the rasterized image data, thus executing printing of the application data.

Various processes in a document management system according to the first embodiment will be explained with reference to flow charts. In these flow charts, the same reference numerals denote the same processing steps.

Figure 3:
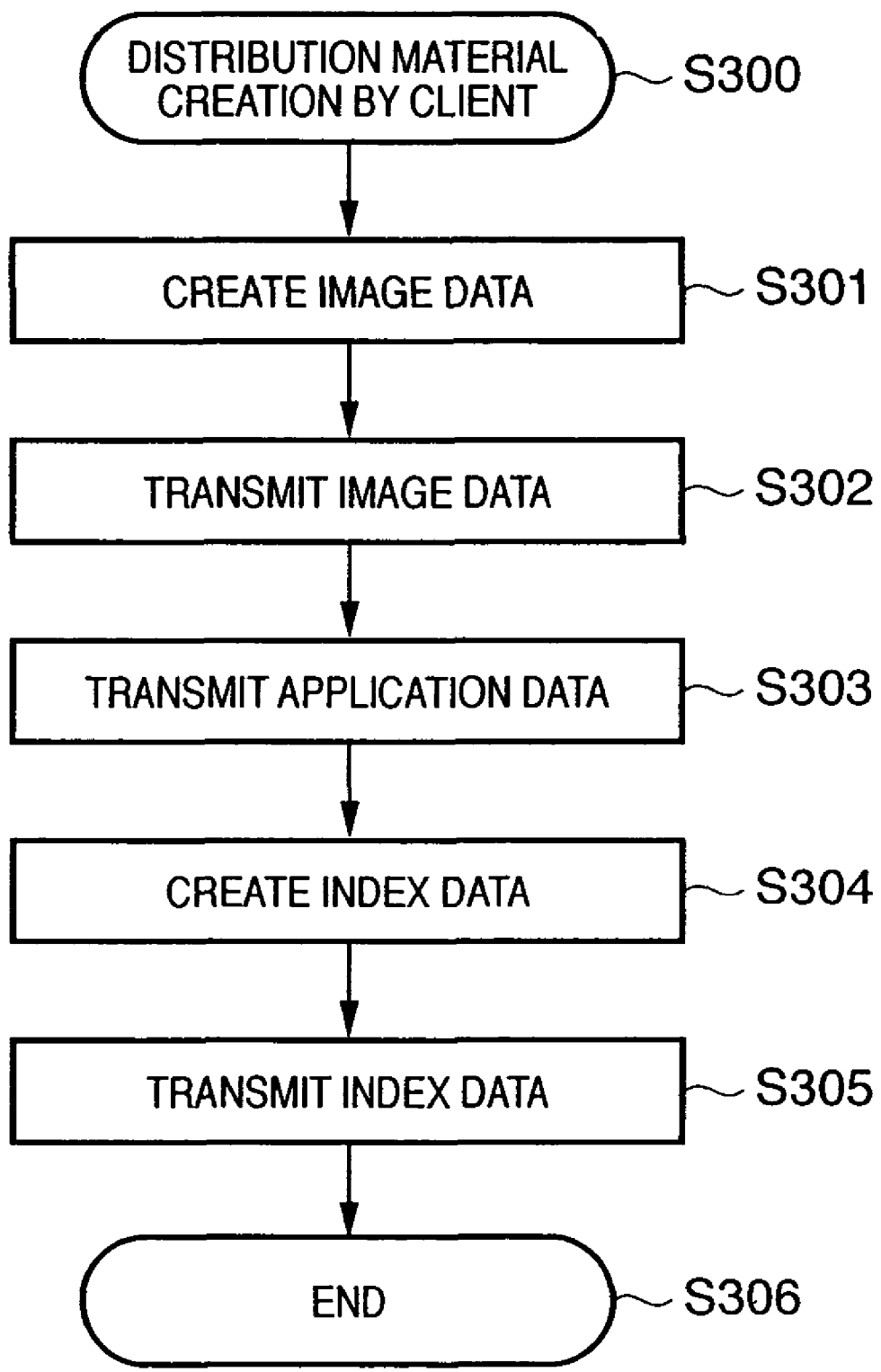
FIG. 3 is a flow chart showing processing of a personal computer according to the embodiment of the present invention.

FIG. 3 is a flow chart showing processing of transmitting original data to the multifunction copying apparatus 105 by the PC 101 in order to print a distribution material. If a distribution material creation program is activated in accordance with a user instruction, this processing starts (step S300).

In step S301, image data of the PDF file format that is formed from data of each page is created from the application data 120 by using the printer driver function. The created image data is transmitted to the multifunction copying apparatus 105 (step S302). The application data 120 serving as the original data of the image data is also transmitted to the multifunction copying apparatus 105 (step S303).

The transmitted image data and application data are stored in the database of the multifunction copying apparatus 105. For this purpose, index data capable of managing and searching for these data is created (step S304). The created index data is further transmitted to the multifunction copying apparatus 105 (step S305), and the processing ends (step S306).

Data transmission in steps S302, S303, and S305 is realized by the RPC protocol.

Figure 4:
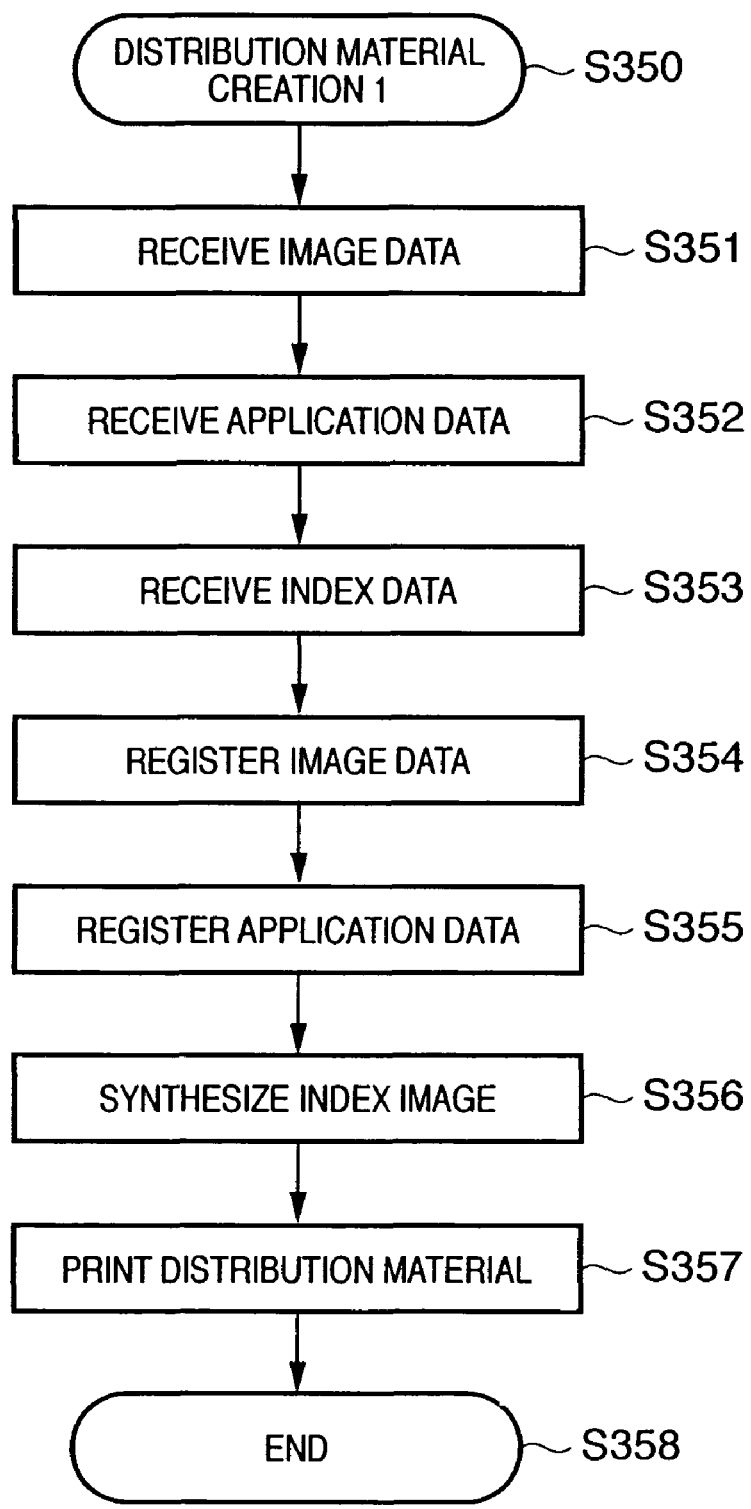
FIG. 4 is a flow chart showing the processing sequence of distribution material creation 1 according to the first embodiment.

FIG. 4 is a flow chart showing processing of creating a distribution material by the multifunction copying apparatus 105 on the basis of image data transmitted from the PC 101 according to the first embodiment. This processing is executed as distribution material creation 1 (step S350).

Image data transmitted from the PC 101 in step S302 is received (step S351), and application data transmitted in step S303 is received (step S352). Index data transmitted from the PC 101 in step S305 is received (step S353).

After reception of the index data, the image data is registered as the image data 124 in the database of the large-capacity disk 106 (step S354), and the application data is registered as the application data 123 in the database (step S355). The received index data allows associating the image data and application data with each other and searching the database for them.

The index data received in step S353 is converted into barcode image data, and synthesized with the received image data (step S356). The barcode data can store many data, and uses a QR code which is a two-dimensional barcode having an error correction function. The barcode is not limited to the QR code, and may be a one-dimensional barcode (e.g., JAN, standard ITF, CODE-128, CODE39, or NW-7) or a two-dimensional barcode (e.g., PDF417, DataMatrix, MaxiCode, VeriCode, or CODE49).

The image created by synthesizing the barcode data and original image data is printed as a distribution material (step S357), and the processing ends (step S358).

The distribution material can be printed by a plurality of copies in accordance with user's designation, and can be printed and distributed by the number of copies necessary for a meeting or the like.

Figure 5:
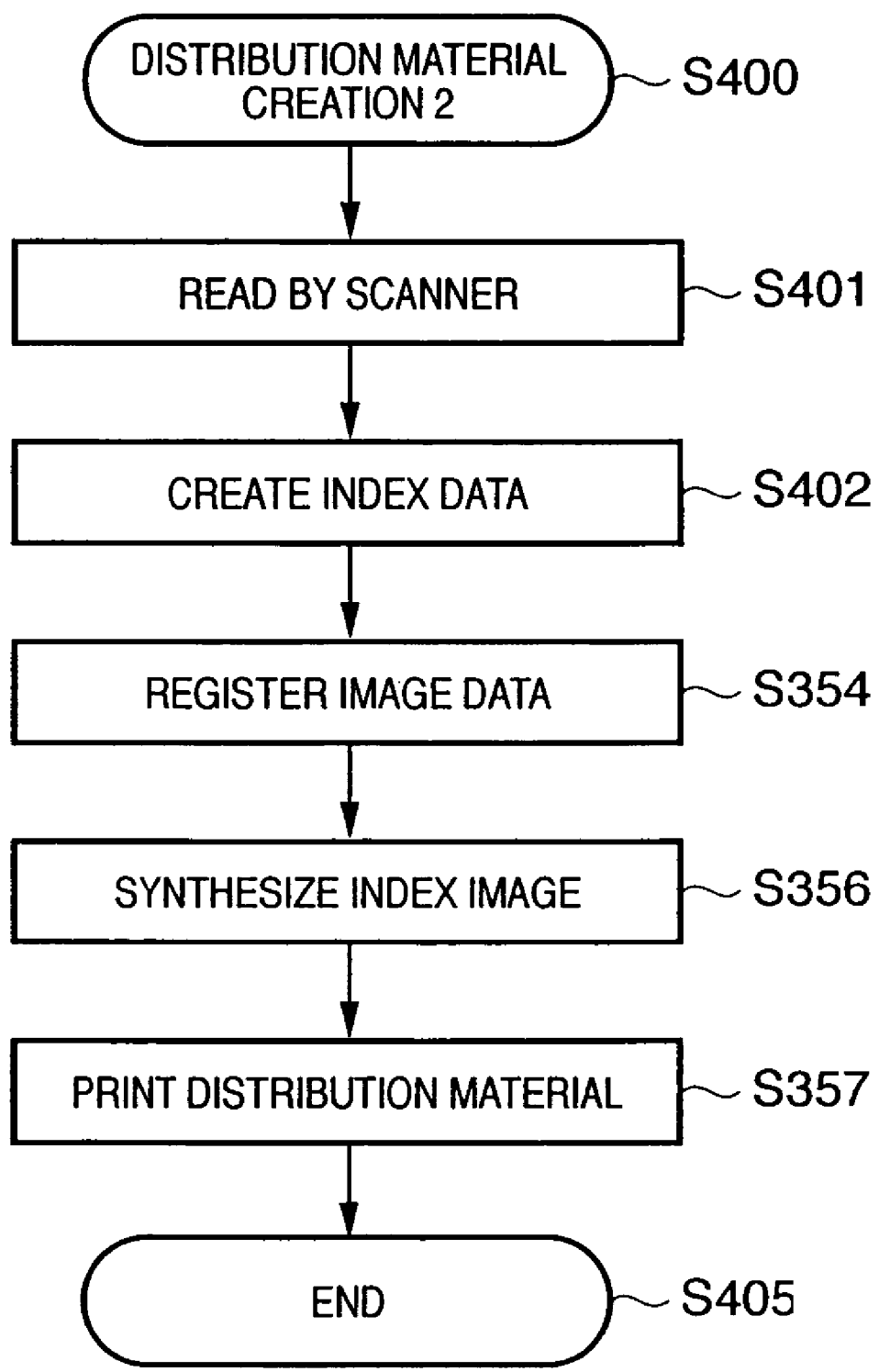
FIG. 5 is a flow chart showing the processing sequence of distribution material creation 2 according to the first embodiment.

FIG. 5 is a flow chart showing processing of creating a distribution material from a paper document by the multifunction copying apparatus 105 according to the first embodiment. This processing is executed as distribution material creation 2 (step S400).

An original is set in the original feeder of the scanner 200, and converted into image data (step S401). The processing advances to step S402 to create an index so as to be able to search the database for the image data read by the scanner 200.

The read image data is registered as the image data 124 in the large-capacity disk 106 (step S354). The index created in step S402 is converted into barcode image data, and synthesized with the image data read by the scanner 200 (step S356). The synthesized image data is printed as a distribution material (step S357), and the processing ends (step S405).

Figure 6:
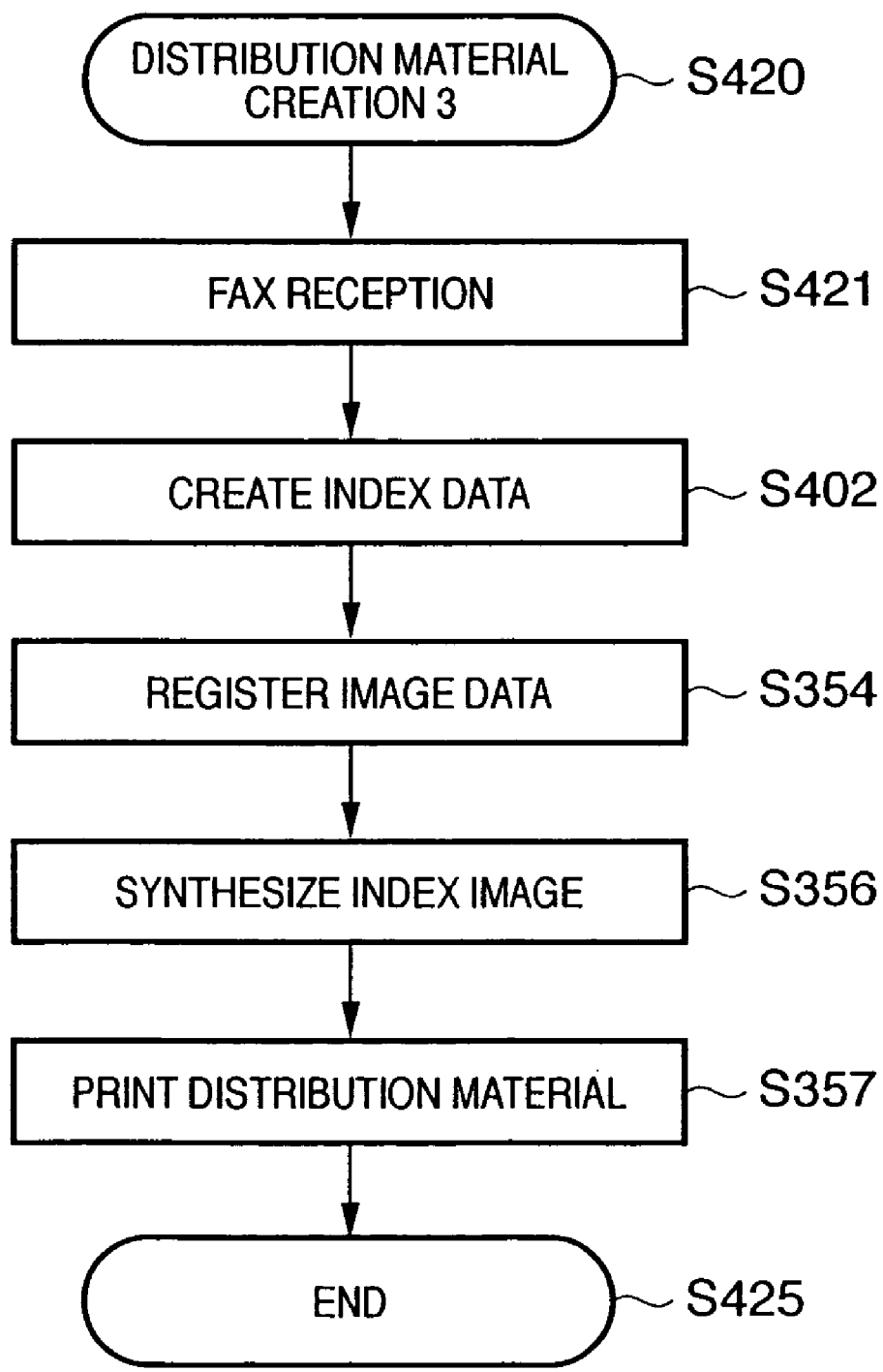
FIG. 6 is a flow chart showing the processing sequence of distribution material creation 3 according to the first embodiment.

FIG. 6 is a flow chart showing processing of creating a distribution material by the multifunction copying apparatus 105 from a document received by the FAX board 208 according to the first embodiment. This processing is executed as distribution material creation 3 (step S420).

If FAX termination is detected, FAX reception is executed by the FAX board 208 (step S421). The received data is converted into image data. An index capable of searching the database for the image data created by the FAX board 208 is created (step S402).

The FAX-received image data is registered as the image data 124 in the large-capacity disk 106 (step S354). The index created in step S402 is converted into barcode image data, and synthesized with the FAX-received image data (step S356). The synthesized image data is printed as a distribution material (step S357), and the processing ends (step S425).

Figure 7:
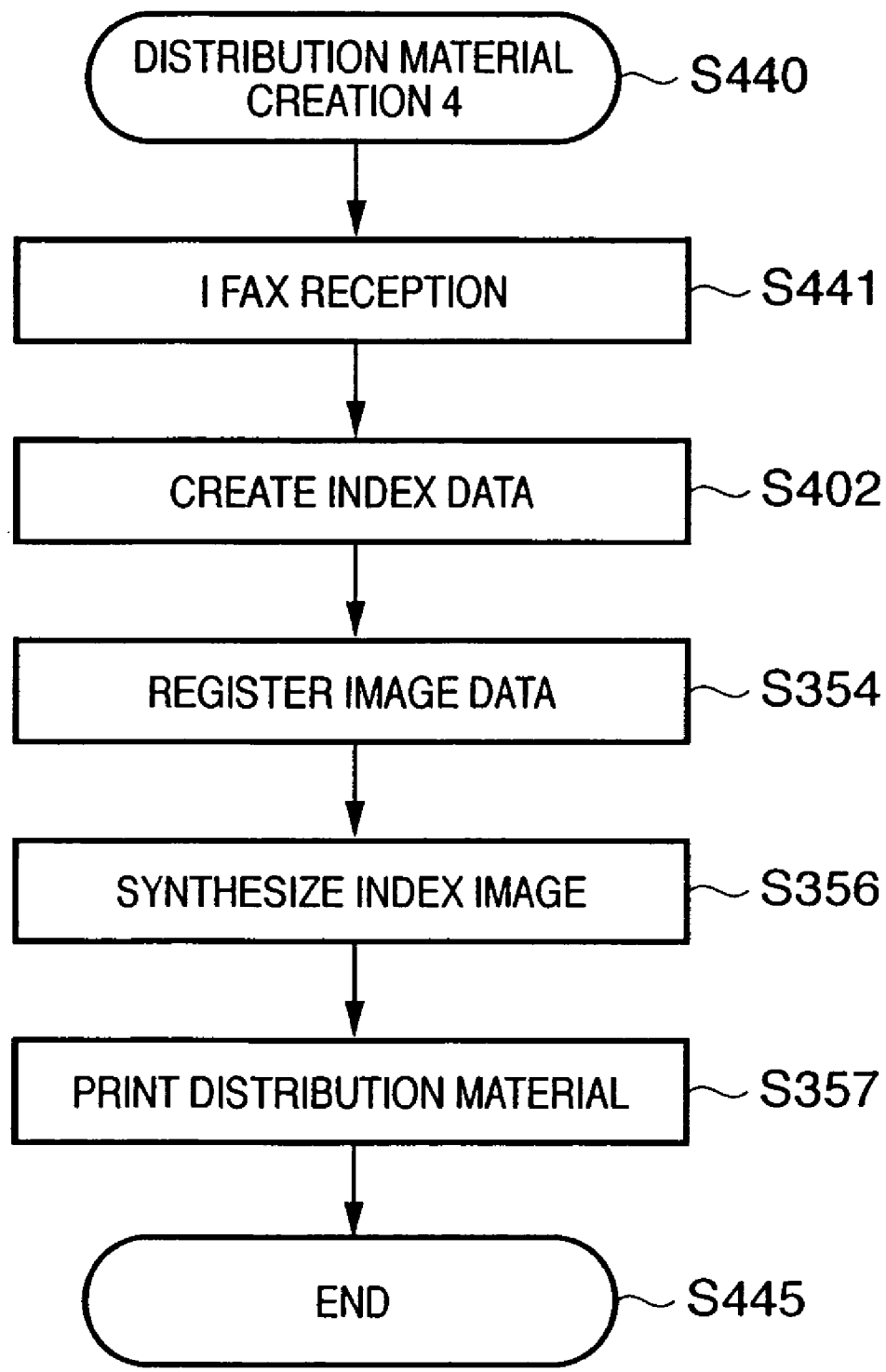
FIG. 7 is a flow chart showing the processing sequence of distribution material creation 4 according to the first embodiment.

FIG. 7 is a flow chart showing processing of creating a distribution material from an IFAX-received document by the multifunction copying apparatus 105 according to the first embodiment. This processing is executed as distribution material creation 4 (step S440).

If electronic mail with a TIFF file is received by POP3 or SMTP, the TIFF file of the received data is extracted, and IFAX reception is executed (step S441). An index capable of searching the database for the image data created by IFAX reception is created (step S402).

The IFAX-received image data is registered as the image data 124 in the large-capacity disk 106 (step S354). The index created in step S402 is converted into barcode image data, and synthesized with the IFAX-received image data (step S356). The synthesized image data is printed as a distribution material (step S357), and the processing ends (step S425).

FIG. 8 is a view showing an example of the distribution material created by one of the processes shown in FIGS. 4 to 7.

An image 450 is an image created by the application of the PC 101, an image read by the scanner 200, a FAX-received image, or an IFAX-received image. As described with reference to FIGS. 4 to 7, the image is registered in the database and can be searched using an index. The index is converted into image data as a QR code 451 which is a two-dimensional barcode. The image data is recorded as index information at a lower right portion of the image 450.

In short, when the multifunction copying apparatus 105 is regarded as a printing apparatus, the feature of the apparatus 105 is to input image data, register the input image data in the database in correspondence with a specific index, synthesize the image data and data on the index, thereby generating an image containing the index information, and print the image containing the index information.

As will be described later, the multifunction copying apparatus 105 according to the first embodiment has the following feature as an image processing apparatus having a reader which reads an original image. That is, predetermined index information recorded in an original image read by the reader is extracted. Based on the extracted index information, image data corresponding to the original image is acquired from the database which stores the image data.

Figure 9:
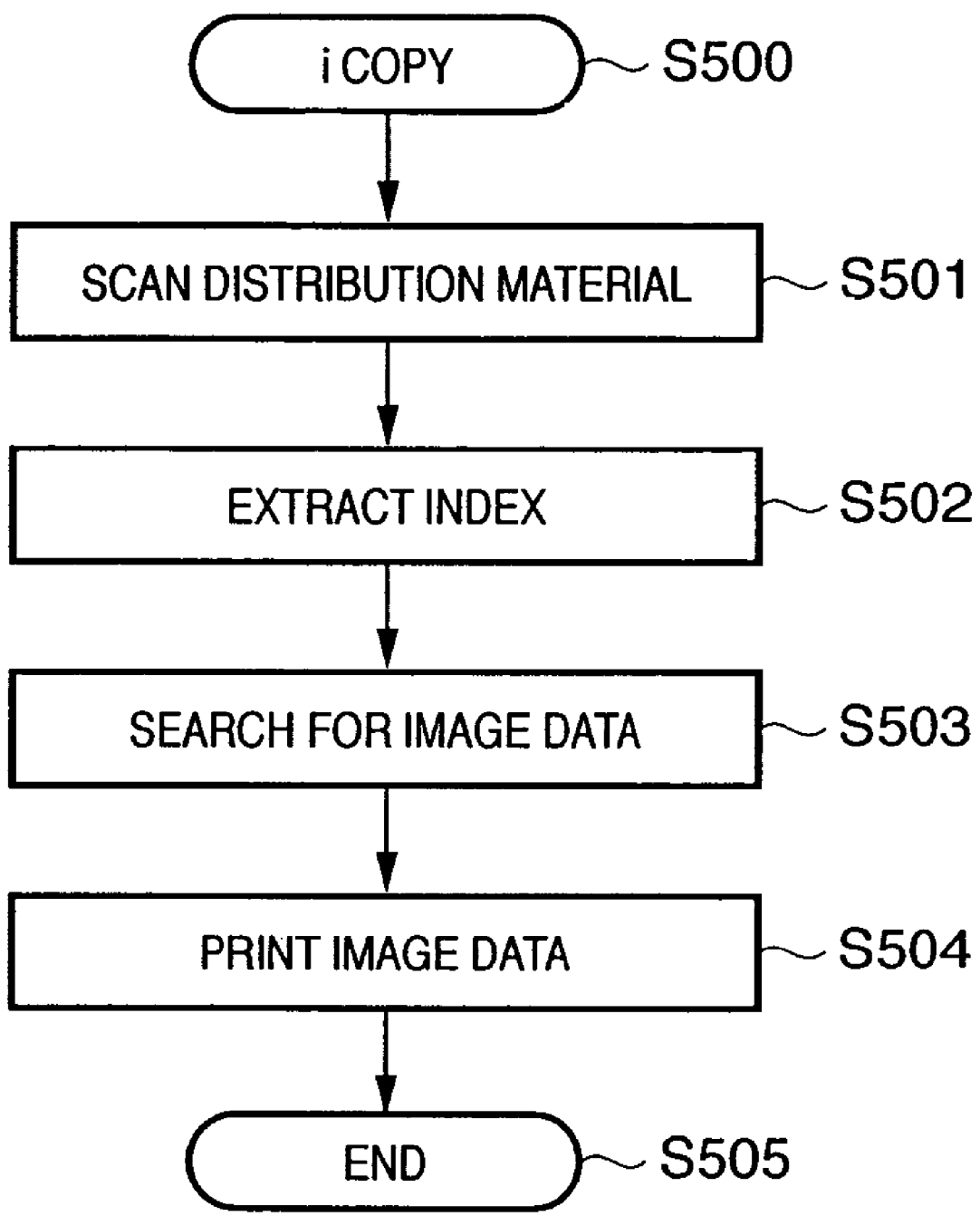
FIG. 9 is a flow chart showing processing of printing an original image from a distribution material according to the first embodiment.
Figure 10:
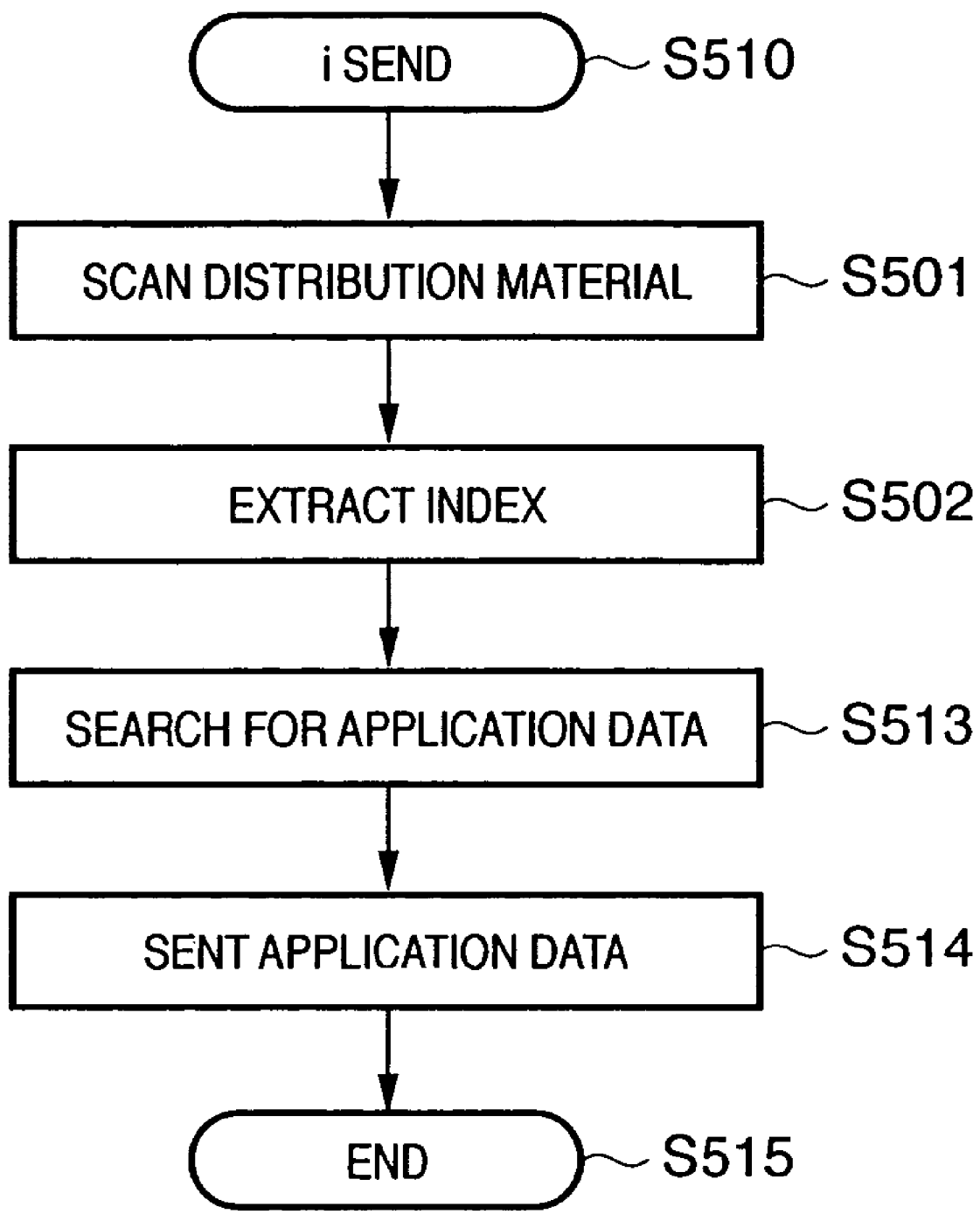
FIG. 10 is a flow chart showing processing of sending application data from a distribution material according to the first embodiment.

The feature of processing shown in FIG. 9 is to print image data acquired by the above processing. The feature of processing shown in FIG. 10 is to acquire original application data of image data from the database instead of the image data in the above processing, and supply the application data for data communication processing via a network such as electronic mail.

These processes will be explained in detail.

FIG. 9 is a flow chart showing processing of searching a material distributed at a meeting or the like for an original image registered in the database and printing the original image by the multifunction copying apparatus 105 according to the first embodiment. This processing is executed as an iCOPY function (step S500).

The distribution material need not be one printed in step S357, but may be a distribution material whose image quality is low because of repetitive copying of a distribution material printed in step S357 by a copying apparatus, a distribution material in which a memorandum is written by another person, a distribution material which is punched for binding by a binder or the like, or a distribution material which is originally a color distribution material but is copied by a monochrome copying machine. However, index information as shown in FIG. 8 must be recorded in the material.

After iCOPY from the UI 204 is designated, a distribution material is scanned by the scanner 200 (step S501) to load the image of the distribution material. The loaded image data is searched for a QR code (451 in FIG. 8) which is a two-dimensional barcode, and the QR code is analyzed to extract the index (step S502). The database in the large-capacity disk 106 is searched for the image data 124 corresponding to the distribution material on the basis of the extracted index (step S503). The acquired image data is printed (step S504), and the processing ends (step S505).

Unlike the distribution material whose image is greatly degraded, the printed image is an image created by the application of the PC 101, an image read and registered by the scanner 200, or a high-quality image received by the FAX or IFAX.

FIG. 10 is a flow chart showing processing of searching a material distributed at a meeting or the like for an original image registered in the database and sending the original image as a file from the multifunction copying apparatus 105 according to the first embodiment. This processing is executed as an iSEND function (step S510).

As described above, the distribution material can be a material whose image is greatly degraded, but index information must be recorded in the material.

After iSEND from the UI 204 is designated, a distribution material is scanned by the scanner 200 (step S501) to load the image of the distribution material. The loaded image data is searched for a QR code (451 in FIG. 8) which is a two-dimensional barcode, and the QR code is analyzed to extract the index (step S502). The database in the large-capacity disk 106 is searched for the application data 123 corresponding to the distribution material on the basis of the extracted index (step S513). The acquired application data is sent by electronic mail or the like (step S514), and the processing ends (step S515).

The sent data is not image data such as a distribution material which has a poor image and can hardly be reused, but application data which can be easily reused and is smaller in data size than image data.

In iCOPY, data converted into image data is selected and printed, and an image free from degradation in comparison with a read original image can be printed. Further, data can be printed at higher speed than data prepared by converting application data into an image after iCOPY is designated. In iSEND, original application data of a read image is selected and sent. The sending destination can provide data which is easily reprocessed using application software. Since the application data is generally smaller in data amount, an increase in network traffic amount can be prevented.

Second Embodiment

In the first embodiment described above, a document database is created in the large-capacity disk 106 of the multifunction copying apparatus 105. The second embodiment performs management of creating a document database in a large-capacity disk 104 connected to a document management server 103.

Compared to the document management server of the large-capacity disk 106 in the multifunction copying apparatus 105, the large-capacity disk 104 can easily increase its storage capacity. Also, a backup medium used to back up data can be easily exchanged.

Figure 11:
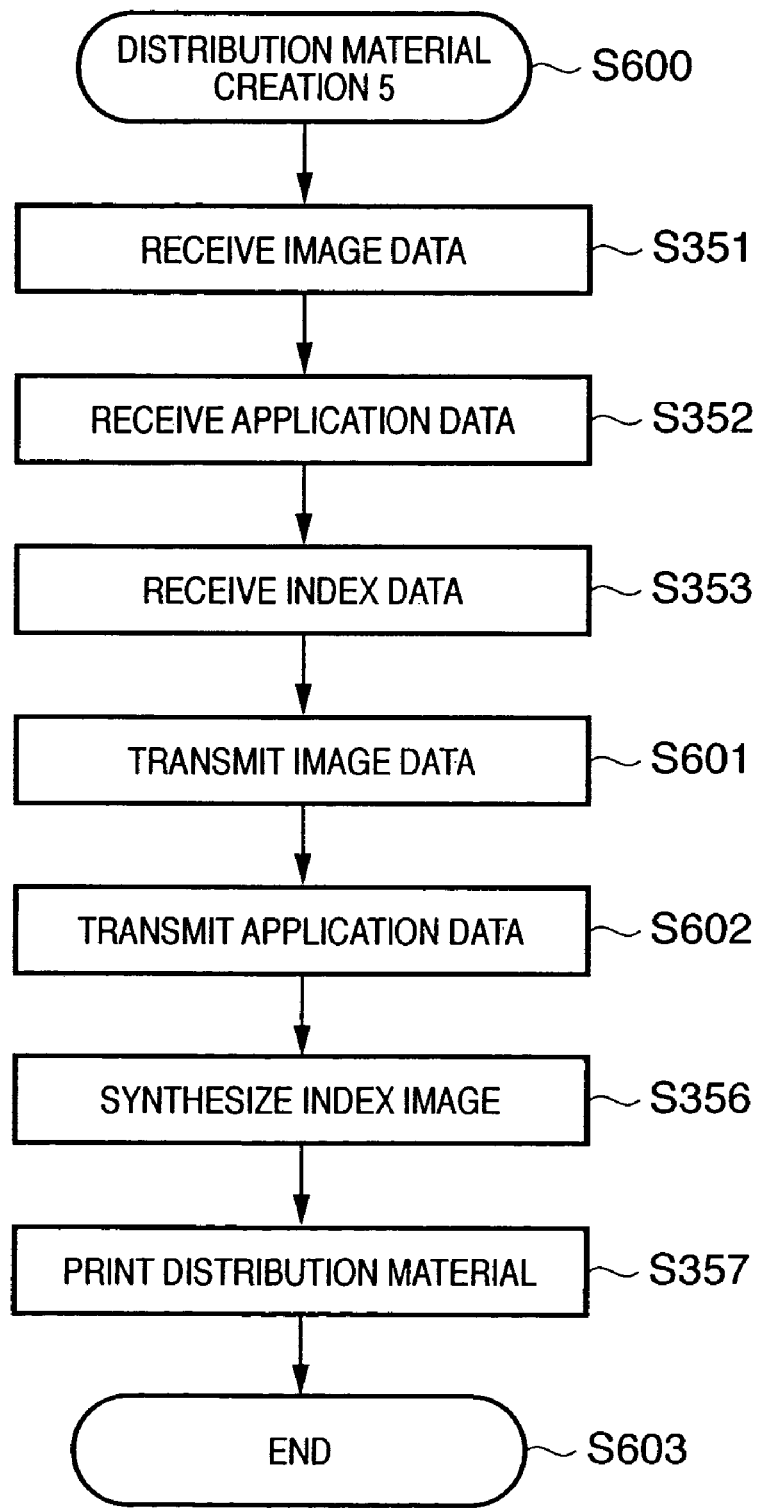
FIG. 11 is a flow chart showing the processing sequence of distribution material creation 5 according to the second embodiment.

FIG. 11 is a flow chart showing processing of creating a distribution material by a multifunction copying apparatus 105 on the basis of image data transmitted from a PC 101 according to the second embodiment. This processing is executed as distribution material creation 5 (step S600).

Image data transmitted from the PC 101 in step S302 (FIG. 3) is received (step S351), and application data transmitted in step S303 is received (step S352). Index data transmitted from the PC 101 in step S305 is received (step S353).

The image data (copied data) is transmitted to the document management server 103 (step S601), and the application data is also transmitted to the document management server 103 (step S602). The transmitted image data and application data are stored in the large-capacity disk 104 of the document management server 103, and managed as image data 122 and application data 121 in the database.

The index data received in step S353 is converted into barcode image data, and synthesized with the received image data (step S356). The barcode data can store many data, and uses a QR code which is a two-dimensional barcode having an error correction function.

The image created by synthesizing the barcode data and original image data is printed as a distribution material (step S357), and the processing ends (step S603).

The distribution material can be printed by a plurality of copies in accordance with user's designation, and can be printed and distributed by the number of copies necessary for a meeting or the like.

Figure 12:
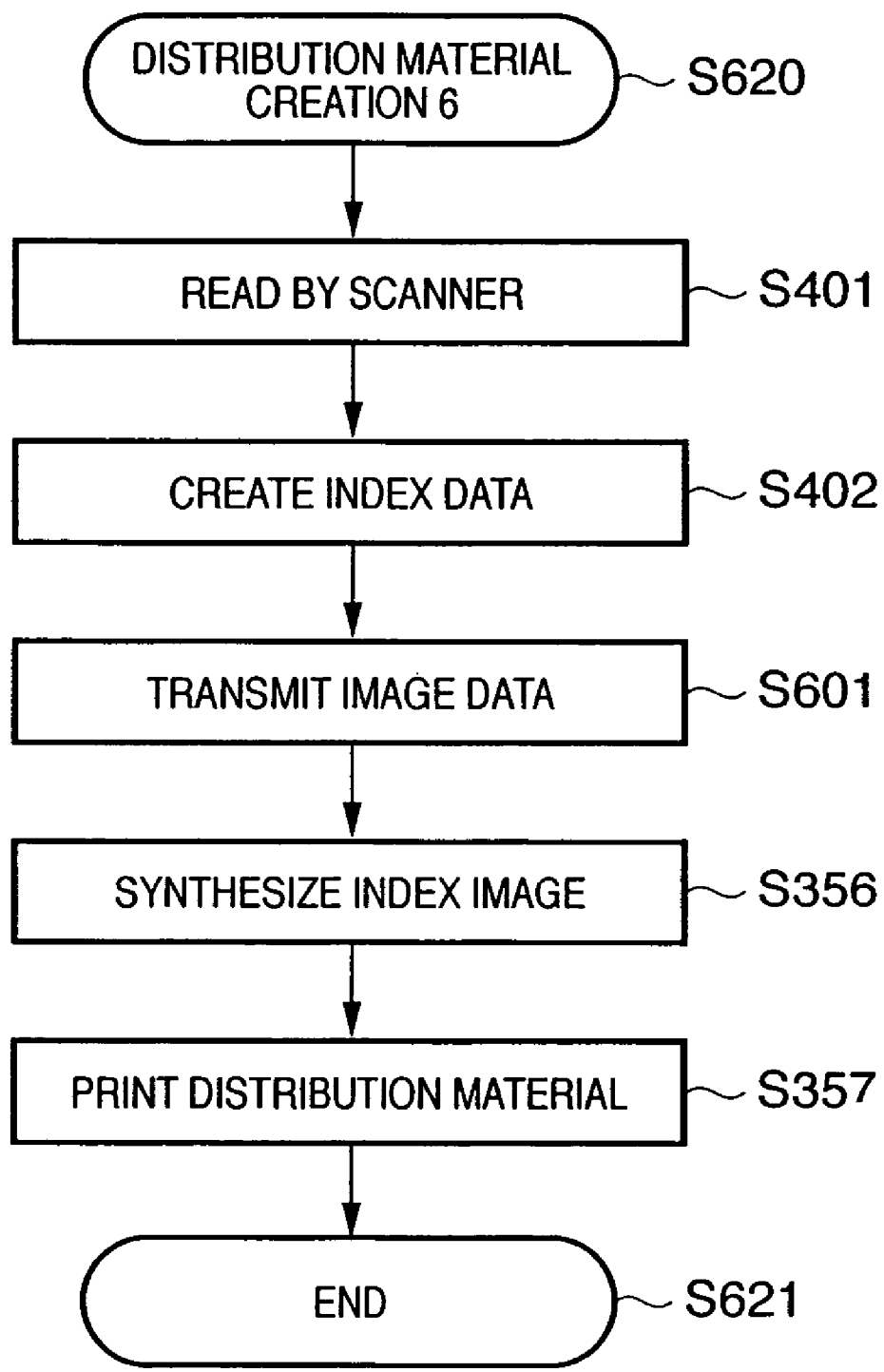
FIG. 12 is a flow chart showing the processing sequence of distribution material creation 6 according to the second embodiment.

FIG. 12 is a flow chart showing processing of creating a distribution material from a paper document by the multifunction copying apparatus 105 according to the second embodiment. This processing is executed as distribution material creation 6 (step S620).

An original is set in the original feeder of a scanner 200, and converted into image data (step S401). The processing advances to step S402 to create an index so as to be able to search the database for the image data read by the scanner 200.

The image data read by the scanner 200 is transmitted to the document management server 103 (step S601). The document management server 103 stores the received image data in the large-capacity disk 104, and manages the image data as the image data 122 in the database.

The index created in step S402 is converted into barcode image data, and synthesized with the image data read by the scanner 200 (step S356). The synthesized image data is printed as a distribution material (step S357), and the processing ends (step S621).

Figure 13:
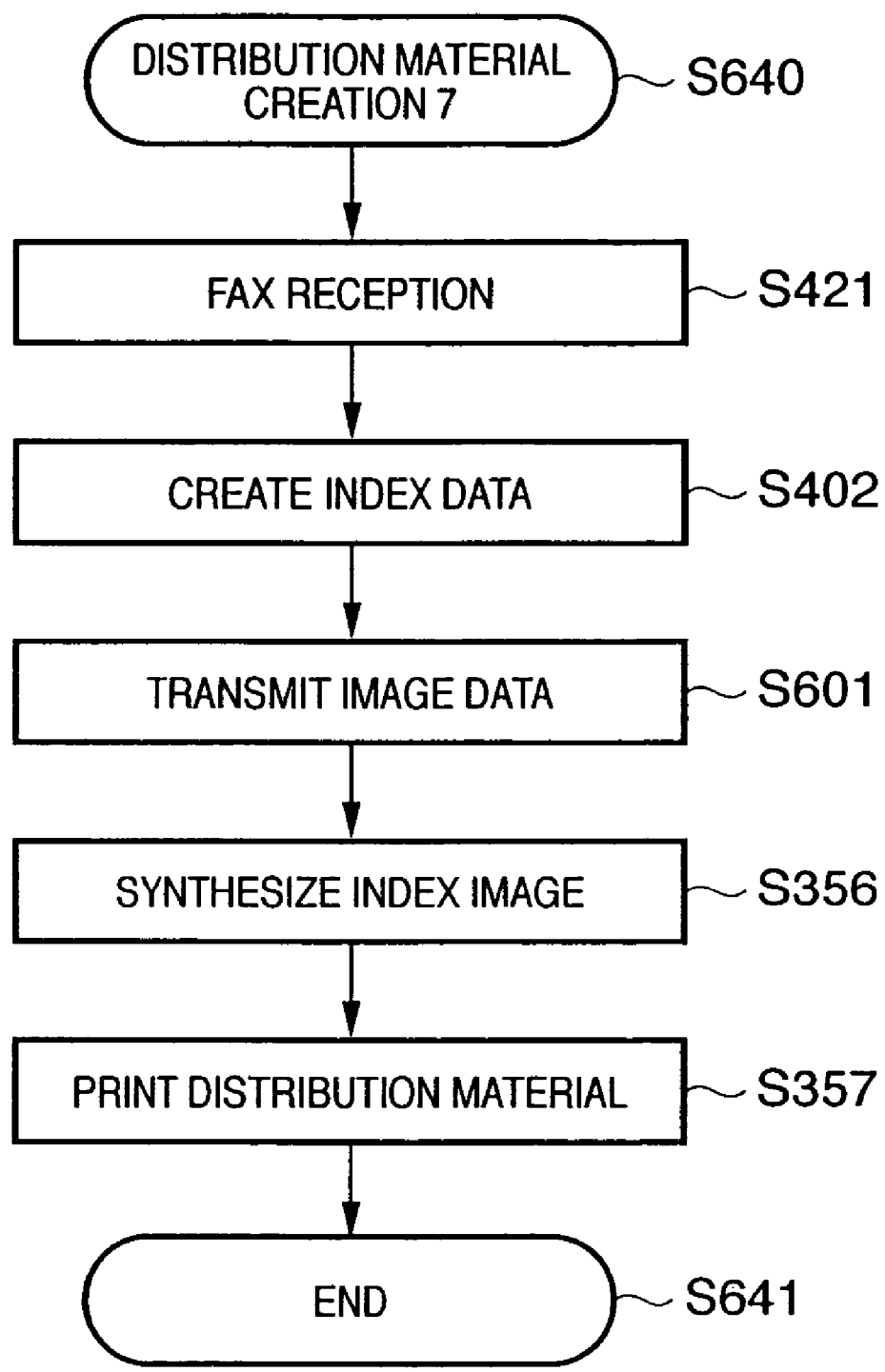
FIG. 13 is a flow chart showing the processing sequence of distribution material creation 7 according to the second embodiment.

FIG. 13 is a flow chart showing processing of creating a distribution material by the multifunction copying apparatus 105 from a document received by a FAX board 208 according to the second embodiment. This processing is executed as distribution material creation 7 (step S640).

If FAX termination is detected, FAX reception is executed by the FAX board 208 (step S421). The received data is converted into image data. An index capable of searching the database for the image data created by the FAX board 208 is created (step S402).

The image data created by the FAX board 208 is transmitted to the document management server 103 (step S601). The document management server 103 stores the received image data in the large-capacity disk 104, and manages the image data as the image data 122 in the database. The registered image received by the FAX can be searched by the document management server 103.

The index created in step S402 is converted into barcode image data, and synthesized with the FAX-received image data (step S356). The synthesized image data is printed as a distribution material (step S357), and the processing ends (step S641).

FIG. 14 is a flow chart showing processing of creating a distribution material from an IFAX-received document by the multifunction copying apparatus 105 according to the second embodiment. This processing is executed as distribution material creation 8 (step S660).

If electronic mail with a TIFF file is received by POP3 or SMTP, the TIFF file of the received data is extracted, and IFAX reception is executed (step S441). An index capable of searching the database for the image data created by IFAX reception is created (step S402).

The image data created by IFAX reception is transmitted to the document management server 103 (step. S601). The document management server 103 stores the received image data in the large-capacity disk 104, and manages the image data in the database. That is, the IFAX-received image is registered as the image data 122 in the large-capacity disk 104, and can be searched by the document management server 103.

The index created in step S402 is converted into barcode image data, and synthesized with the IFAX-received image data (step S356). The synthesized image data is printed as a distribution material (step S357), and the processing ends (step S661).

Figure 15:
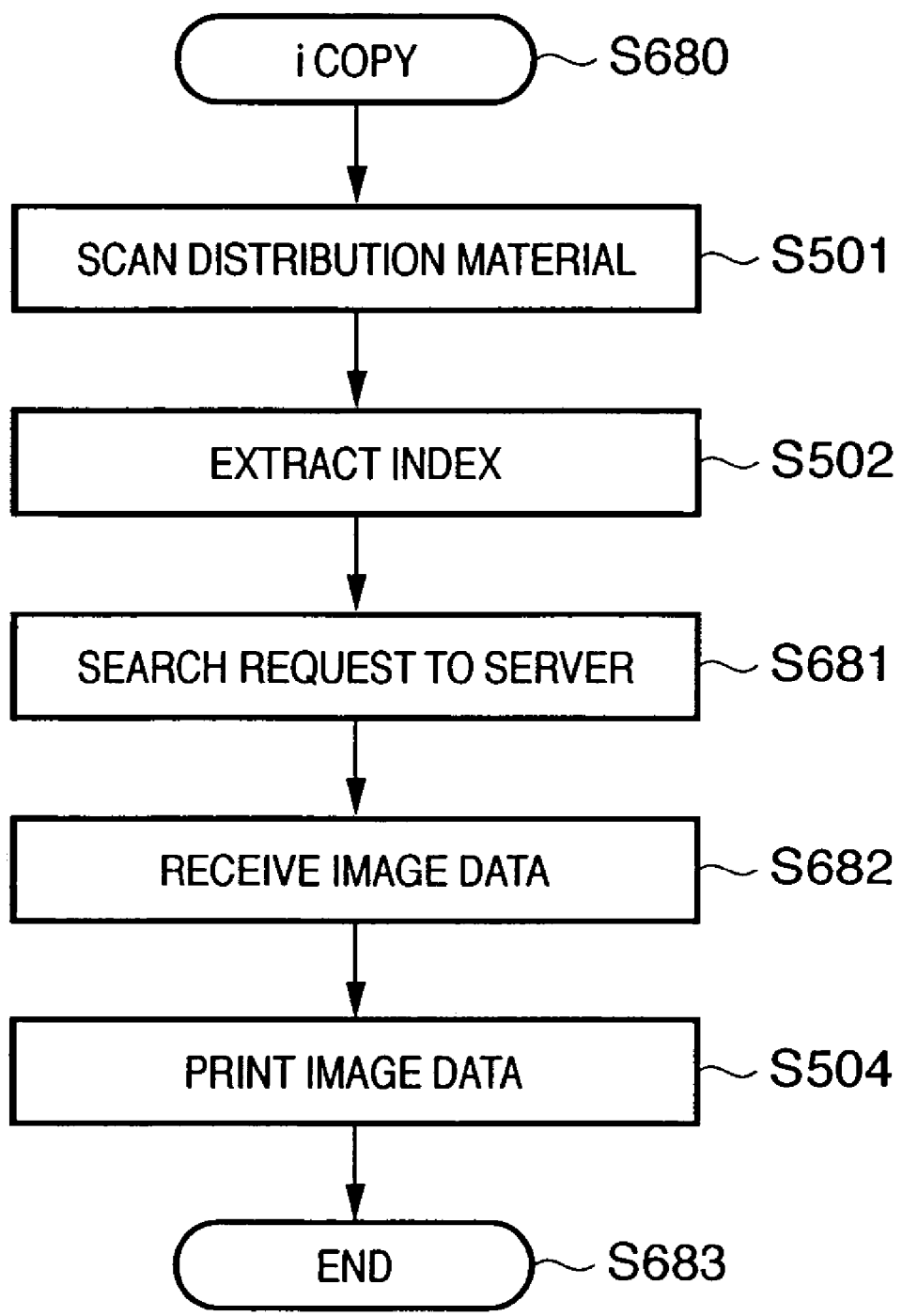
FIG. 15 is a flow chart showing processing of printing an original image from a distribution material according to the second embodiment.

FIG. 15 is a flow chart showing processing of searching a material distributed at a meeting or the like for an original image registered in the database and printing the original image by the multifunction copying apparatus 105 according to the second embodiment. This processing is executed as an iCOPY function (step S680).

The distribution material need not be one printed in step S357, but may be a distribution material whose image quality is low because of repetitive copying of a distribution material printed in step S357 by a copying apparatus, a distribution material in which a memorandum is written by another person, a distribution material which is punched for binding by a binder or the like, or a distribution material which is originally a color distribution material but is copied by a monochrome copying machine. However, index information as shown in FIG. 8 must be recorded in the material.

A distribution material is scanned by the scanner 200 (step S501) to load the image of the distribution material. The loaded image data is searched for a QR code (451 in FIG. 8) which is a two-dimensional barcode, and the QR code is analyzed to extract the index (step S502).

The document management server 103 is requested to search the database on the basis of the extracted index (step S681). The document management server 103 searches the large-capacity disk 104 on the basis of the search-requested index, and transmits corresponding image data 122 to the multifunction copying apparatus 105.

The multifunction copying apparatus 105 receives the image data transmitted from the document management server 103 (step S682), prints the received image data (step S504), and ends the processing (step S683).

Unlike the distribution material whose image is greatly degraded, the printed image is an image created by the application of the PC 101, an image read and registered by the scanner 200, or a high-quality image received by the FAX or IFAX.

Figure 16:
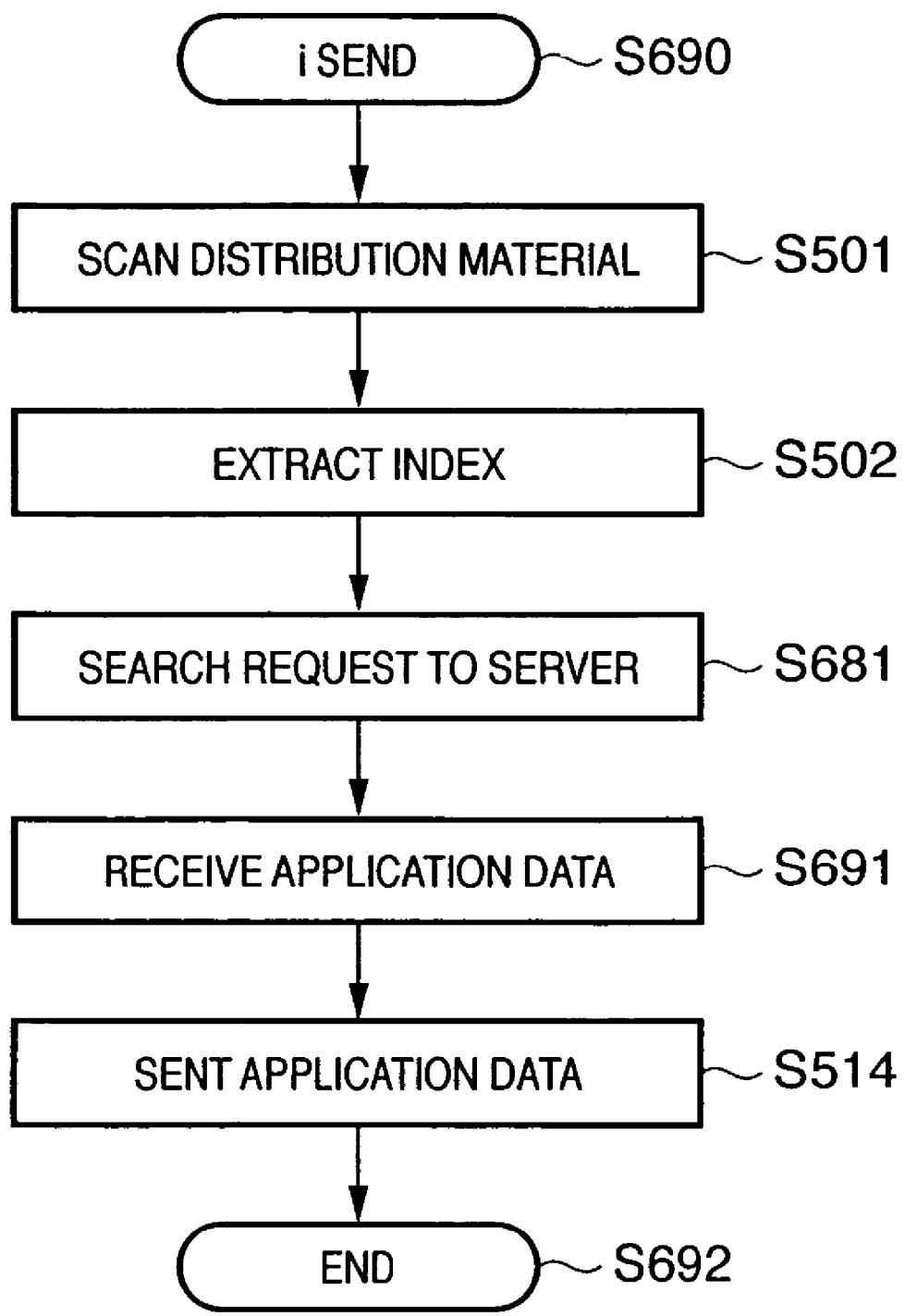
FIG. 16 is a flow chart showing processing of sending application data from a distribution material according to the second embodiment.

FIG. 16 is a flow chart showing processing of searching a material distributed at a meeting or the like for an original image registered in the database and sending the original image from the multifunction copying apparatus 105 according to the second embodiment. This processing is executed as an iSEND function (step S690).

As described above, the distribution material can be a material whose image is greatly degraded, but index information must be recorded in the material.

A distribution material is scanned by the scanner 200 (step S501) to load the image of the distribution material. The loaded image data is searched for a QR code (451 in FIG. 8) which is a two-dimensional barcode, and the QR code is analyzed to extract the index (step S502).

The document management server 103 is requested to search the database on the basis of the extracted index (step S681). The document management server 103 searches the large-capacity disk 104 on the basis of the search-requested index, and transmits corresponding application data 121 to the multifunction copying apparatus 105.

The multifunction copying apparatus 105 receives the application data transmitted from the document management server 103 (step S691), sends the received application data (step S514), and ends the processing (step S692).

The sent data is not image data such as a distribution material which has a poor image and can hardly be reused, but application data which can be easily reused and is smaller in data size than image data.

Third Embodiment

In the first and second embodiments described above, a QR code serving as a two-dimensional barcode is recorded as index information in an image. The form of the index information is not limited to this. For example, as shown in FIG. 17, a character string 700 can be used as index information to perform processing corresponding to the character string.

In the example of FIG. 17, a character string "PC_COPY.abc.co.jp/DB/001" is recorded as the index information 700. "PC_COPY.abc.co.jp" is the address of a multifunction copying apparatus, and "/DB/001" represents the directory name. That is, image data and application data of this distribution material are stored in the directory "/DB/001" in the multifunction copying apparatus at the address "PC_COPY.abc.co.jp".

In iCOPY (see FIG. 9 or 15), OCR processing is executed in index data extraction processing of step S502. Index data of the recoded character string is extracted, and image data is searched from the database and printed.

Similarly, in iSEND (see FIG. 10 or 16), OCR processing is executed in index data extraction processing of step S502. Index data of the recoded character string is extracted, and application data is searched from the database and printed.

Fourth Embodiment

The form of index information is not limited to the above-mentioned barcode or character string. For example, the spacing can be controlled between characters in a specific character string. The correspondence is defined such that data is '1' for a wide character spacing in the character string and '0' for a narrow character spacing. A generated data string can be used as index information.

Examples will be described.

FIG. 18 is a table showing an example of the correspondence between each character spacing and the index for a specific character string "Dear".

For example, for an index "000", character spacings in the specific character string "Dear" are narrowed, as represented by 800 in FIG. 18.

For an index "001", only the spacing between 'a' and 'r' is widened, and the spacings between the remaining characters are narrowed, as represented by 801.

For an index "010", only the spacing between 'e' and 'a' is widened, and the spacings between the remaining characters are narrowed, as represented by 802.

For an index "011", the spacings between 'e' and 'a' and between 'a' and 'r' are widened, and the spacing between the remaining characters is narrowed, as represented by 803.

For an index "100", only the spacing between 'D' and 'e' is widened, and the spacings between the remaining characters are narrowed, as represented by 804.

For an index "101", the spacings between 'D' and 'e' and between 'a' and 'r' are widened, and the spacing between the remaining characters is narrowed, as represented by 805.

For an index "110", the spacings between 'D' and 'e' and between 'e' and 'a' are widened, and the spacing between the remaining characters is narrowed, as represented by 806.

For an index "111", all the character spacings are widened, as represented by 807.

The character spacing can be adjusted when an image file is created from application data in image data creation processing of step S301 (see FIG. 3). Index information can be embedded by widening or narrowing the spacing between characters.

FIG. 18 shows a simple example. If a specific character string is set long, the embedded information amount increases, and index information can be embedded in a printing image.

In this case, in iCOPY (see FIG. 9 or 15), index data is extracted from the character spacing in a specific character string in index data extraction processing of step S502. The database is searched for image data in accordance with the index data, and the image data is printed.

In iSEND (see FIG. 10 or 16), index data is extracted from the character spacing in a specific character string in index data extraction processing of step S502. The database is searched for image data in accordance with the index data, and the image data is sent.

In the above example, index information is embedded using the character spacing between characters. The same effects can also be obtained by changing the character size or font style.

According to the above-described embodiments, a print image file can be efficiently searched and printed by associating and managing the print image file and application file in a database. A high-quality image can be obtained at high speed.

In transmitting an image, corresponding application data is transmitted, realizing the reuse of the data. Since the application data is smaller in data size than image data, the transmission rate can be increased. Both the print image file and application file can be significantly associated and managed in the database.

In any embodiment, when no application data exists upon designation of iSEND, data registered as image data is sent. When the registered data is facsimile-received image data or image data attached to received electronic mail, the image data is sent. This image data is almost free from degradation, compared to image data read upon designation of iSEND. Even in this case, high-quality image data can be provided to the sending destination.

If the database which registers data is managed by an external server, the capacity of the data recording medium can be easily increased, and data can also be backed up in various backup media. Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:
 a storage unit configured to store both application data and print data with a common index, the application data being created by predetermined application software and being converted into the print data suitable for printing;
 a transmitting unit configured to transmit data to an external apparatus;
 a printing unit configured to print an image on a sheet based on the print data;
 a designation unit configured to designate one of a transmitting process and a printing process as a data output method;
 an accepting unit configured to accept information indicating the common index of data to be output by the designated data output method; and
 a control unit configured to, when said designation unit designates the transmitting process as the data output method, select the application data among both the application data and the print data in said storage unit with the common index indicated by the accepted information and control said transmitting unit to transmit the selected application data without converting the selected application data into the print data, and, when said designation unit designates the printing process as the data output method, select the print data among both the application data and the print data in said storage unit with the common index indicated by the accepted information and control said printing unit to print, without converting the application data into the print data after said designation unit designates the printing process, an image based on the selected print data.

2. The apparatus according to claim 1, wherein said printing unit prints an image obtained by synthesizing the information indicating the common index and the print data stored in the storage unit.

3. The apparatus according to claim 2, further comprising:
 a scanning unit configured to scan a printed material on which a predetermined code is printed;
 an index input unit configured to analyze the predetermined code, which is printed on the printed material, and to input the common index corresponding to the analyzed predetermined code, wherein the predetermined code is expressed by a barcode.

4. The apparatus according to claim 2, wherein the information indicating the common index is expressed by a character string.

5. The apparatus according to claim 2, wherein the information indicating the common index is expressed by each character spacing in a predetermined character string.

6. The apparatus according to claim 2, wherein when the output method designated by said designation unit is printing by said printing unit, said control unit selects the print data and causes said printing unit to print an image based on the print data.

7. The apparatus according to claim 1, wherein when the output method designated by said designation unit is transmission by said transmitting unit, said control unit causes said transmitting unit to transmit the application data.

8. The apparatus according to claim 1, wherein the storage unit is constructed by a terminal connected via a network.

9. An image processing method of an image processing apparatus, the method comprising:
 a storing step of storing both the application data and print data in a storage unit with a common index, the application data being created by the predetermined application software and being converted into the print data suitable for printing;

a transmitting step of transmitting data to an external apparatus by a transmitting unit;

a printing step of printing an image on a sheet based on the print data by a printing unit;

a designation step of designating one of a transmitting process and a printing process as a data output method;

an accepting step of accepting information indicating the common index of data to be output by the designated data output method; and a control step, when the transmitting process is designated in said designation step as the data output method, select the application data among both the application data and the print data in said storage unit with the common index indicated by the accepted information and control said transmitting unit to transmit the selected application data without converting the selected application data into the print data, and, when the printing process is designated in said designation step as the data output method, select the print data among both the application data and the print data in said storage unit with the common index indicated by the accepted information and control said printing unit to print, without converting the application data into the print data after the printing process is designated in said designation step, an image based on the selected print data.

10. A non-transitory computer readable storage medium storing a program that, when executed by a computer, performs an image processing method of an image processing apparatus, the method comprising:

a storing step of storing both the application data and print data in a storage unit with a common index, the application data being created by the predetermined application software and being converted into the print data suitable for printing, a transmitting step of transmitting data to an external apparatus by a transmitting unit, a printing step of printing an image on a sheet based on data by a printing unit, a designation step of designating one of a transmitting process and a printing process as a data output method, an accepting step of accepting information indicating the common index of data to be output by the designated data output method, and a control step of, when the transmitting process is designated in said designation step as the data output method, select the application data among both the application data and the print data in said storage unit with the common index indicated by the accepted information and control said transmitting unit to transmit the selected application data without converting the selected application data into the print data, and, when the printing process is designated in said designation step as the data output method, select the print data among both the application data and the print data in said storage unit with the common index indicated by the accepted information and control said printing unit to print, without converting the application data into the print data after the printing process is designated in said designation step, an image based on the selected print data.

* * * * *